July 4, 1950  J. V. HENDRICK  2,513,800
CLAMP FOR BONDING BRAKE LININGS TO BRAKE SHOES
Filed Jan. 27, 1948
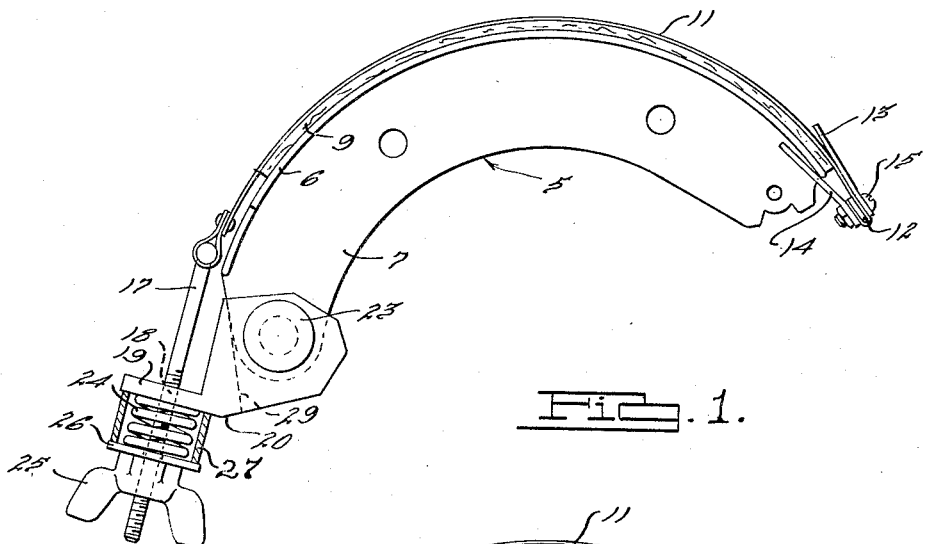
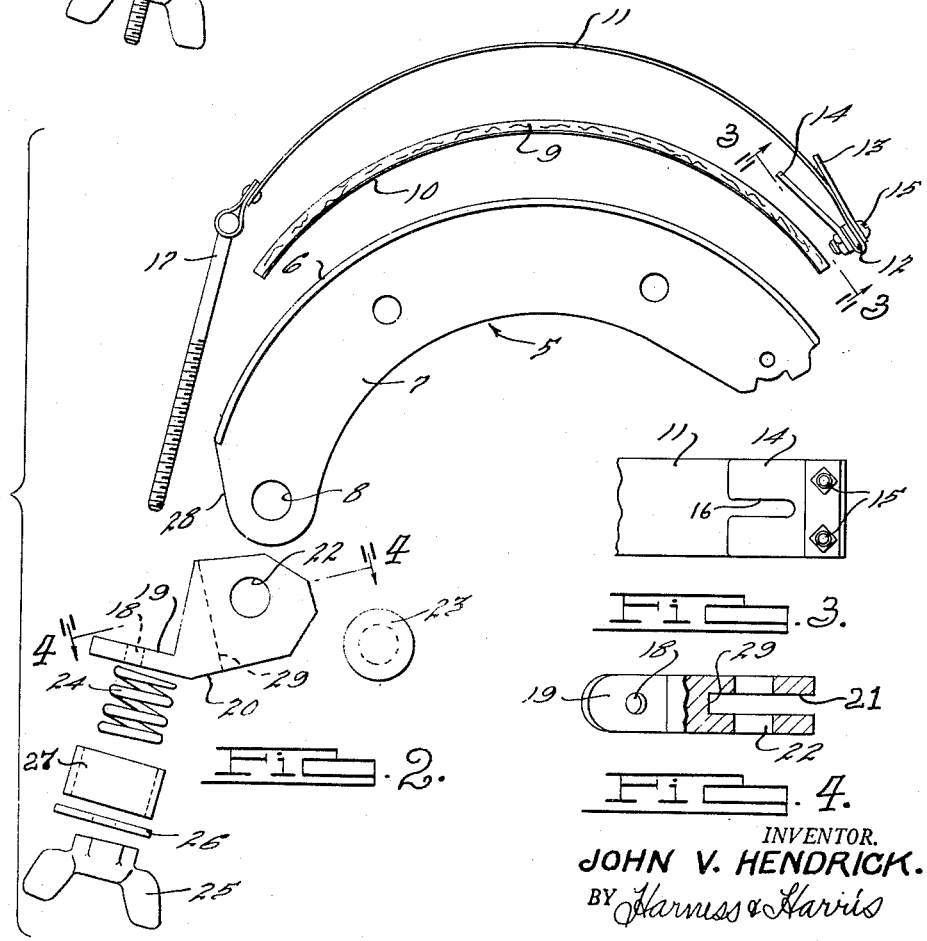
INVENTOR.
JOHN V. HENDRICK.
BY Harness & Harris
ATTORNEYS.

Patented July 4, 1950

2,513,800

UNITED STATES PATENT OFFICE 2,513,800

CLAMP FOR BONDING BRAKE LININGS TO BRAKE SHOES

John V. Hendrick, Highland Park, Mich., assignor to Chrysler Corporation, Highland Park, Mich., a corporation of Delaware Application January 27, 1948, Serial No. 4,521

2 Claims. (Cl. 154—1)

This invention relates to a clamp and more particularly to a clamp for applying pressure to a brake lining and a brake shoe while effecting a surface bond therebetween.

The attachment of a brake lining to a brake shoe by a film or layer of adhesive between adjacent surfaces thereof necessitates pressing these parts together with a force sufficient to establish and maintain the surfaces in intimate contact during setting of the adhesive and when the adhesive used is a heat setting one, the clamp must be able to withstand the temperature employed for setting the adhesive.

An object of the invention is to provide a simple and compact clamp for pressing the brake lining and shoe together during surface bonding thereof; and provide a clamp which can be readily applied to the lining and shoe assembly and which will exert the requisite pressure and maintain the same in the presence of a temperature necessary to set the adhesive employed for surface bonding. In carrying out the foregoing, the clamp includes means for storing pressure applying force which takes up and maintains the requisite pressure in response to any otherwise diminution of pressure due to the clamp reacting to the temperature employed to set the adhesive and shrinkage of the latter during setting.

More specifically, an object of the invention is the provision of a clamp including a spring through which pressure is applied to the brake lining and the brake shoe, and which is loaded as an incident to pressure application and provides in effect a follow up pressure to compensate for any relaxation of normal pressure during the time the clamp and shoe assembly are subjected to the necessary temperature for setting of the adhesive.

Another object of the invention is the provision of a clamp which can be securely attached at one end thereof to an end of the shoe and lining assembly and wrapped thereabout by the exertion of a pulling force at the other end of the clamp and the shoe and lining assembly to press the lining and shoe together.

It is important in bonding lining to a shoe to form a good bond at the terminal ends of the lining and a further object of the invention is the provision of a clamp which will exert the necessary pressure at the shoe ends during setting of the adhesive.

A further object of the invention is the provision of a clamp as aforesaid for use in connection with shoe and lining assemblies of relatively different radii.

Other objects and advantages of the invention will be more apparent from the following description taken in connection with the accompanying drawings, in which:

Fig. 1 is a plan view showing the clamp in pressure applying assembly with a brake shoe and a brake lining.

Fig. 2 is an exploded view in plan showing the clamp, lining, and brake shoe of Fig. 1 disassembled.

Fig. 3 is a fragmentary elevational view taken as indicated by the line 3—3 of Fig. 1.

Fig. 4 is a view partly in section taken as indicated by the line 4—4 of Fig. 2.

In the drawings, the numeral 5 designates a brake shoe typical of those employed in the wheel brake for a motor vehicle, the shoe having an arcuate rim 6 and a web 7. The heel end of the shoe has an opening 8 in the web adapted to receive a pin for mounting the shoe relative to its support (not shown) and when thus mounted the shoe will be forced into braking engagement with the cooperating wheel drum by a force applied at the other or toe end of the shoe. Each shoe carries a lining segment 9 of well known material having suitable friction characteristics for effecting the maximum braking force when the lining is urged against the wheel brake drum.

The lining 9 is subject to wear with a resulting diminution of its thickness thereof and it has been proposed to surface bond the lining to the shoe rim, rather than rivet the same together, and thus extend the useful life of the lining and avoid the possibility of metallic contact between the rivets and brake drum due to wear of the lining. Any suitable adhesive may be used to bond the lining to the shoe, and such adhesive may be applied to a surface of the lining or the shoe rim or both, although it has been determined that the requisite bond can be had by applying a film or layer of thermosetting adhesive or cement to the inner surface of the lining. The shoe and lining are then pressed together to secure intimate contact between the adjacent surfaces thereof with the adhesive therebetween during the setting or curing of the adhesive or cement. Certain thermosetting adhesives or cements, usable for this purpose, may be set or cured by exposing the same to a temperature of 325° F. for a period of fifteen minutes. A very thin film of this adhesive or cement will suffice and the same is illustrated at 10, applied to the inner surface of the lining 9, as shown in Fig. 2.

The clamp includes a relatively flexible arcuate strap 11, preferably metallic, which engages the outer surface of the lining 9 and has an arcuate contour. That end of the strap which is to be engaged with the shoe at the toe end thereof, as shown in Fig. 1, is reversely bent with a spacer 12 between the folds and a plate 13 and a plate 14 are riveted or bolted as at 15 to the band and spacer 12. A wedge-shaped space is provided between the strap 11 and plate 13 at one side and the plate 14 at the other side, and the shoe and lining extend into the space, the end of the strap at spacer 12 extending beyond the adjacent ends of the shoe and lining, as shown in Fig. 1. In order to fix the strap 11 at this end of the shoe, the plate 14 has a slot 16 which receives the shoe web 7, the terminal edge of the latter engaging the end wall of slot 16 to resist a pulling force to be applied to the other end of the strap. This disposition of the shoe web in the slot 16 prevents lateral shifting of the band end relative to the shoe.

The strap 11 extends beyond the other end of the lining, as shown in Fig. 1, and has a threaded rod 17 secured thereto which extends through an opening 18 in the ear 19 of an anchor member 20, a clearance being provided between the rod and opening. The anchor member 20 has a slot 21 in the main body thereof for receiving the web at the heel end of the shoe, and has an opening 22 therethrough, intersecting the slot 21 and registering with the opening 8 in the web to receive a pin 23 which connects the member 19 with the shoe 5.

The rod 17 extends beyond the ear 19 and through a coil spring 24, one end of the latter abutting the ear. A wind nut 25 is threaded onto the end portion of the rod which projects beyond the spring 24, a washer 26 being interposed between the nut and adjacent end of the coil spring.

A sleeve 27 surrounds the spring 24 and is positioned between the ear 19 and washer 26. At the initial pull exerted on the strap 11 by threading of the nut 25 onto the rod, the sleeve 27 has axial clearance between the washer 26 and ear 19 and when the requisite pressure has been applied to the lining and shoe this clearance is taken up, as indicated in Fig. 1. The spring 26 is calibrated to cause the strap 11 to produce a predetermined pressure against the lining when the spring has been so compressed as to take up the axial clearance between the sleeve 27 and the ear 19 and washer 26 in response to threading of the nut 25 onto the rod 17. When this clearance has been taken up and the predetermined pressure thus established, the resistance to further threading of the nut onto the rod will be sufficient to apprise the operator of this fact.

Any tendency of the anchor member 20 to rotate relative to the shoe while the pulling force is being exerted on the strap to draw the same against the lining as aforesaid will be resisted by the engagement of the web edge 28 with the end wall 29 of the slot 21.

The assembly as shown in Fig. 1 is subjected to a temperature, as by placing in a heated oven, sufficiently high to set the adhesive and should the latter shrink during setting, the loaded spring will function to take up any release of pressure incident to such shrinkage or heat reaction which the strap may undergo.

The strap 11 and rod 17 are of such length that the clamp may be used in connection with shoes having relatively different radii.

I claim:

1. A clamp for use in securing a brake lining segment to a brake shoe having an arcuate rim, comprising a strap adapted to be attached at one end thereof to an end of said shoe and to be drawn against the lining segment to press the same against the shoe rim, an anchor member detachably engageable with the other end of the shoe and having an opening therethrough, a threaded element secured to the other end of the strap and extending through the opening in the anchor member, a nut threadable onto said threaded element, a spring mounted between said anchor member and said nut adapted to be loaded by the threading of said nut onto said threaded element, said spring being so calibrated as to transmit a predetermined pressure to said lining segment through said band in response to predetermined loading of said spring, and means positioned between said anchor member and said nut and engageable with said anchor member opposing the threading of said nut onto said threaded element when said spring has been placed under said predetermined load.

2. A clamp for use in securing a brake lining segment to a brake shoe having an arcuate rim, comprising a strap adapted to be attached at one end thereof to an end of said shoe and to be drawn against the lining segment to press the same against the shoe rim, an anchor member detachably engageable with the other end of the shoe and having an opening therethrough, a threaded element secured to the other end of the strap and extending through the opening in the anchor member, a nut threadable onto said threaded element, a spring mounted between said anchor member and said nut adapted to be loaded by the threading of said nut onto said threaded element, said spring being so calibrated as to transmit a predetermined pressure to said lining segment through said band in response to predetermined loading of said spring, and a sleeve surrounding said spring and said threaded element and disposed between said nut and said anchor member limiting threading of said nut onto said threaded element when said spring has been placed under said predetermined load.

JOHN V. HENDRICK.

REFERENCES CITED

The following references are of record in the file of this patent:

UNITED STATES PATENTS

| Number | Name | Date |
|---|---|---|
| 1,600,672 | Janowski | Sept. 21, 1926 |
| 1,903,058 | McNaught | Mar. 28, 1933 |